Oct. 10, 1939.     H. L. BERNARDE     2,175,869
ELECTRONIC APPARATUS
Filed Sept. 5, 1936

WITNESSES:

INVENTOR
Henry L. Bernarde.
BY
ATTORNEY

Patented Oct. 10, 1939

2,175,869

UNITED STATES PATENT OFFICE 2,175,869

ELECTRONIC APPARATUS

Henry L. Bernarde, Kearny, N. J., assignor to Westinghouse Electric & Manufacturing Company, East Pittsburgh, Pa., a corporation of Pennsylvania Application September 5, 1936, Serial No. 99,630

8 Claims. (Cl. 234—69)

The present application is a continuation-in-part of my copending application entitled Electronic control system, Serial No. 660,356, filed March 11, 1933, and assigned to the Westinghouse Electric & Manufacturing Company, which has matured into Patent No. 2,075,083, dated March 30, 1937.

The above-mentioned application and the present application relate to electrical apparatus of the type in which a comparatively heavy indicating or recording instrument, or a control device such as a valve, switch or rheostat, is accurately positioned in accordance with some variable of relatively low energy level. The present invention relates particularly to apparatus of the class indicated, in which an electronic device or amplifier is used to increase the power available for controlling the indicating or recording instrument or other heavy device whose movements are to be controlled.

It is an object of my invention to provide a novel device of the class indicated, in which a primary measuring element, such as a galvanometer or other delicate instrument, controls a fluid impedance to provide an electrical variable and the electrical variable so produced is amplified by means of electronic apparatus and supplied to a motor to cause movement of the heavy indicating or recording instrument or other device to be controlled.

A further object of my invention is to provide a novel arrangement of electronic and electrolytic apparatus of general utility in connection with recorders and similar apparatus.

In accordance with my invention, the operating potentials for controlling the operation of the recorder are picked off of an electrified channel of high resistance liquid by a pair of contacts dipping therein. One of the contacts is moved by any meter or gauge responsive to the condition or quantity to be recorded such, for example, as a voltmeter, wattmeter, steam gauge, etc. The other contact is moved adjacent the first contact by the controlled element or recorder pen and reduces the operating potential to zero when the controlled element has moved to the proper position.

Figure 1:
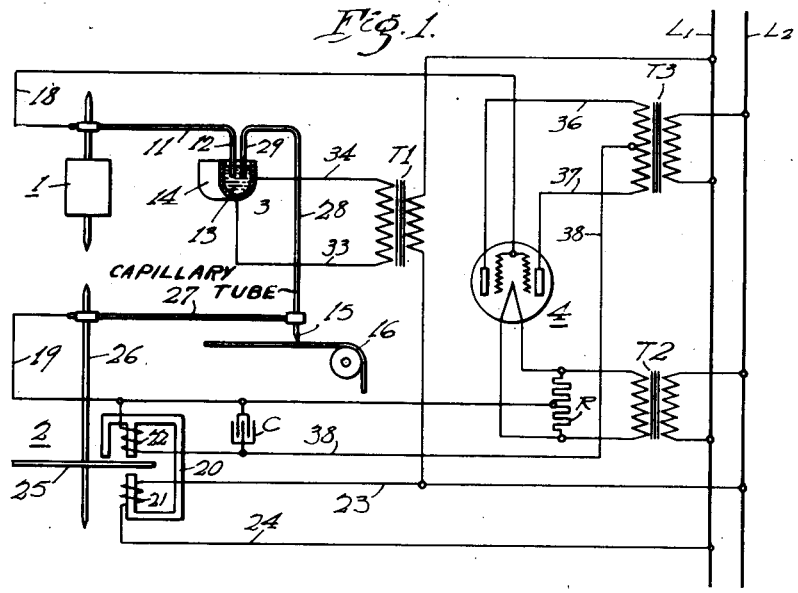
Figure 2:
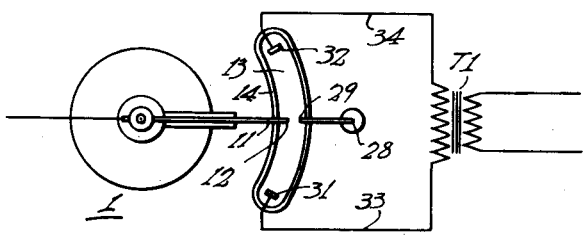

The invention itself, however, both as to its organization and its method of operation, together with additional objects and advantages thereof, will best be understood from the following description of specific embodiments, when read in conjunction with the accompanying drawing, in which:

Figure 1 is a diagrammatic view representing an embodiment of my electronic system for controlling a device such as a graphic recording meter; and Fig. 2 is a plan view of the potential deriving means utilized in the system of Fig. 1.

Referring more specifically to the drawing, the apparatus shown in Figs. 1 and 2 comprises a primary measuring element 1, a motive device 2, a fluid impedance 3 for deriving from an original alternating potential a variable alternating potential for controlling the system, and suitable electronic means such as a vacuum tube or tubes 4 for rendering the derived potentials effective to control the system.

The primary measuring element 1 which controls the system may be a moving element of any suitable gauge or meter responsive to the conditions to be recorded whether they be voltage, current, pressure, temperature or some other condition. The adaptation of any meter to my system merely involves mounting on a movable part of the meter a laterally extending finger 11 of conducting material having a down turned extremity or point 12 which dips into a liquid 13 supported in an adjacent trough 14 and serves as a movable electrode of the rheostat.

The motive device 2 may be a recorder motor of the induction disk type for driving the pen 15 of the graphic meter across a record sheet 16 which may be moved under the pen in any well known manner. Such a motor comprises a two-phase field structure 20 having two windings 21 and 22. One of the windings 21 is connected by suitable conductors 23 and 24 to main line conductors L1 and L2 of a commercial alternating current line from which it is continuously energized.

The other winding 22 of the motor when energized through the tube 4, in a manner to be subsequently described, sets up a field which in conjunction with that set up by the normally energized winding 21 creates a torque in an adjacent eddy current disk 25 which is thereby caused to rotate in a manner which will be readily understood. The disk 25 is secured to a shaft 26 to which is also secured a movable member 27 which supports the recording pen 15. The member 27, which is of conducting material, also supports, in conductive relation thereto, a capillary tube 28 which is provided with a down turned point 29 which dips into the liquid 13. The capillary tube 28 serves to conduct ink to the pen 15, and also serves as a follow-up electrode in the operation of the apparatus as a whole.

As more clearly shown in Fig. 2, the liquid supporting trough 14 of the fluid impedance 3 is of elongated arcuate configuration, of about 120 degrees, having a radius of curvature substantially equal to the radius of rotation of the electrodes 12 and 29 about the axis of rotation in alignment with shaft 26. Hence, the electrodes 12 and 29 sweep freely through the liquid 13 during the movements of the primary element 1 and the motive device 2 and do not create frictional resistance which would interfere with the instruments and render the system inaccurate. Any friction which the liquid offers to the moving points is very slight, is uniformly smooth, and approaches zero as the velocity of motion approaches zero. The slight liquid friction presents aids in damping the movements of the instruments and does not introduce any inaccuracy.

In the ends of the liquid containing trough 14 are mounted stationary electrodes 31 and 32 which are connected by conductors 33 and 34 to the terminals of the secondary winding of a transformer T1. The ratio of the transformer T1 may be selected according to the liquid used and the sensitivity desired. Although a special electrolyte such as alcohol may be used, I have found that satisfactory results may be secured, and the apparatus simplified, by using the ink for the recording pen 15 as the electrolyte.

As will be understood, the electrification of the liquid between the stationary electrodes 31 and 32 sets up an electrical potential gradient field in the liquid along the longitudinal axis of the trough. When the movable electrodes 12 and 29 are at equal longitudinal positions in the trough, as shown in Fig. 2, they are at equal potentials but when they occupy different longitudinal positions, they will pick up alternating current potentials the difference between which is proportional to the longitudinal displacement between them.

Not only the amplitude, but also the polarity of the derived potentials will also vary in accordance with the relative positions of the movable electrodes 12 and 29. Assuming that electrode 12 moves to a position between movable electrode 29 and stationary electrode 32 at an instant when the latter is positive, the polarity of electrode 12 will be positive relative to that of electrode 29. If electrode 12 moved in the opposite direction, its polarity would be negative at the instant when electrode 32 is positive. Hence, the fluid impedance 3 operates to vary both the phase and the magnitude of the derived potentials.

In order that the derived potentials may be rendered effective to control the energizing current of the winding 22 of the two-phase recorder motor, the electrode 12 is connected to the grid of the vacuum tube 4 through the arm 11 and a conductor 18 extending therefrom. The follow-up electrode 29 is connected to the filament of the tube 4 by a circuit which may be traced by way of the capillary tube 28, arm 27, and conductor 19 extending therefrom to a center tapped resistor R connected in shunt with the filament. The derived potentials from the electrodes 12 and 29 are thus impressed on the input of the tube 4. The secondary winding of the filament heating transformer T2 may be provided with a center tap to receive the grid return instead of using the center tapped resistor R, if desired.

As shown, the tube 4 is provided with two plates which are connected by suitable conductors 36 and 37 to the terminals of a center tapped secondary winding of a plate transformer T3. A conductor 38 extends from the center tap of said winding through the winding 22 of the two-phase recorder motor to the grid return conductor 19 and thence to the filament of the tube 4. The winding 22 is preferably shunted by a condenser C to provide a reactive component and increase the torque of the motor thereby decreasing the power that must be supplied by the tube 4.

The primary winding of the plate transformer T3 is connected directly to the main line conductors L1 and L2 from which it is continuously energized and the plates of the tube are alternatively biased positively with respect to the filament.

The movable electrodes 12 and 29 being connected directly across the grid and filament of the tube 4, the latter is controlled by the derived alternating potentials picked up from the electrified liquid 13, and during each half cycle when the grid is positive, a direct current impulse will be passed through the plate circuit 38 and the associated winding 22 of the two-phase motor.

Since the other winding 21 of the two-phase motor is normally energized by alternating current from the main line, the disk 25 of the motor will be caused to rotate and the direction of its rotation will depend upon the direction of the field set up by the alternating current at the instants when the direct current impulses are passed through the plate circuit.

As previously set forth, the fluid impedance means 3 controls the phase relation of the derived potential, relative to the original alternating current line potential, according to the positions of the movable electrodes relative to the stationary electrodes 31 and 32 in the ends of the trough.

Hence, the relative positions of the movable electrodes 12 and 29 by controlling the amplitude and phase relation of the derived potentials also controls the magnitude of the direct current impulses in the plate circuit of tube 4 and their phase relation to the original line potentials and thereby controls the speed and direction of rotation of the motor 2.

In operation, a variation of the condition to which the primary element 1 is responsive, will cause it to operate and it will move the movable electrode 12 longitudinally in the trough 14 away from the other following electrode 29. As previously set forth, the device 3 then picks up an alternating current potential from the high resistance energized liquid 13 of a phase and amplitude which varies according to the relative position of the points. The derived potentials are then impressed upon the grid of the tube 4 which controls the energization of one winding of the two-phase motor thereby causing it to run in a direction which is determined by the phase of said derived alternating current potential and at a speed which is in accordance with the amplitude thereof.

The motor 2 is so arranged and connected into the circuit that the direction it will move in response to an initial movement of electrode 12 in either direction will be such as to move the associated electrode 29 in the same direction. As the electrode 29 approaches electrode 12, the derived potential is thereby gradually diminished to zero and the motor comes to a stop gradually without hunting when the electrodes 12 and 29 are adjacent. The controlled element or pen 15 is simultaneously moved to a corresponding position.

It will be understood that a pair of three element tubes may be substituted for the double plate tube, if desired. My system is also adaptable to control other apparatus than a graphic recording meter, the latter being disclosed merely as a specific application of my control system.

I do not intend that the present invention shall be restricted to the specific structural details, arrangement of parts or circuits connections herein set forth as various modifications thereof may be effected without departing from the spirit and scope of my invention. I desire therefore that only such limitations shall be imposed as are indicated in the appended claims.

I claim as my invention:

1. In a system responsive to a variable condition, means for establishing a graduated electrical potential field, means controlled by said variable condition including a control member independent of the means for establishing said field and associated with said field, for movement in accordance with said variable condition, a follow-up member associated with said field, said members being independently movable in directions such that a displacement of either of said members produces a change in potential therebetween, a motive means for moving said follow-up member, and an energy source for said motive means, said energy source including energy transmission connections between said members and said motive means for moving said follow-up member in accordance with a movement of said control member.

2. In a system responsive to a variable condition, an electrical fluid impedance member, a pen, said pen having an ink supply channel communicating with the fluid of said fluid impedance member for supplying said pen with ink, and an operating system including said fluid impedance member for moving said pen in accordance with said variable condition.

3. In apparatus responsive to a variable condition, a source of voltage, movable means to be operated in accordance with said variable condition, a primary responsive element for said variable condition, an electronic device operatively connected to said source for producing an output condition controlled by the energization of said electronic device, a fluid impedance having a movable member controlled by said primary responsive element and having a movable follow-up member, means for establishing a potential gradient in said fluid impedance, said electronic device being energized from said fluid impedance by means of said movable member and said follow-up member, and motive means responsive to the output condition of said electronic device for producing movement of said movable means in accordance with said variable condition, said follow-up member being connected for movement with said movable means in accordance with movement of said movable member until the deflection of said follow-up member corresponds to the deflection of said movable member.

4. In apparatus responsive to the magnitude of a variable condition, a source of alternating voltage, movable means to be operated in accordance with said variable condition, a primary element responsive to said variable condition, an electronic device operatively connected to said source to produce an alternating output condition controlled by the energization of said electronic device, a fluid impedance having a movable member controlled by said primary responsive element and having a movable follow-up member, means for establishing a potential gradient in said fluid impedance, said electronic device being energized from said fluid impedance by means of said movable member and said follow-up member, and an alternating current motor responsive to said alternating output condition for producing movement of said movable means in accordance with said variable condition, said follow-up member being connected for movement with said movable means in accordance with movement of said movable member until the deflection of said follow-up member corresponds to the deflection of said movable member.

5. In apparatus responsive to the magnitude of a variable condition, a source of alternating voltage, movable means to be operated in accordance with said variable condition, a primary element responsive to said variable condition, an electronic device operatively connected to said source to produce an alternating output condition controlled by the energization of said electronic device, a fluid impedance having electrodes for controlling the energization of said electronic device, said fluid impedance comprising an arcuate trough having a liquid therein, a movable electrode mounted for arcuate movement in said trough, said movable electrode being controlled by said primary responsive element, a follow-up electrode mounted for arcuate movement in said trough, clear of said movable electrode, means for establishing a potential gradient in said fluid impedance, and an alternating current motor responsive to said alternating output condition for producing movement of said movable means in accordance with said variable condition, said follow-up electrode being connected for movement with said movable means in accordance with movement of said movable electrode until the deflection of said follow-up electrode corresponds to the deflection of said movable electrode.

6. In apparatus for recording a variable condition, a recording pen to be operated in accordance with the magnitude of said variable condition, operating means for said recording pen comprising a primary element responsive to said variable condition, an electrical fluid impedance having an operating member controlled by said primary responsive element, having a follow-up member, and having a fluid body serving as ink supply for said recording pen and as impedance for the fluid impedance; means for establishing a potential gradient in said fluid impedance, and motive means responsive to the difference in potential between said members for producing movements of said recording pen and follow-up member in accordance with said variable condition.

7. In a follow-up system, fluid electrical impedance means, means for establishing an electrical potential drop across said fluid electrical impedance means, said fluid electrical impedance means including a pair of members movable relative to each other in the fluid of said fluid electrical impedance means for varying the potential difference therebetween, and means controlled by the potential difference between said members for moving a first one of said members in accordance with a movement of a second one of said members.

8. In a system responsive to a variable condition, a fluid electrical impedance, means for establishing a potential drop across said fluid impedance, a control member engaging the fluid of said fluid electrical impedance, a follow-up member engaging said fluid, said control member being movable relative to said follow-up member for varying the potential difference therebetween, means controlled by s id variable condition for moving said control member, and means controlled by the potential difference between said members for moving said follow-up member in the direction of movement of said control member.

HENRY L. BERNARDE.